(12) United States Patent
Chen et al.

(10) Patent No.: US 10,691,004 B2
(45) Date of Patent: Jun. 23, 2020

(54) PROJECTOR CAPABLE OF PREVENTING LENS FROM SHIFTING

(71) Applicant: QISDA CORPORATION, Taoyuan (TW)

(72) Inventors: Chih-Chia Chen, Taoyuan (TW); Chun-Ming Shen, Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/052,637

(22) Filed: Aug. 2, 2018

(65) Prior Publication Data

US 2019/0391468 A1 Dec. 26, 2019

(30) Foreign Application Priority Data

Jun. 20, 2018 (CN) .......................... 2018 1 0639274

(51) Int. Cl.
*G03B 21/14* (2006.01)
(52) U.S. Cl.
CPC ........... *G03B 21/145* (2013.01); *G03B 21/14* (2013.01)
(58) Field of Classification Search
CPC .............................. G03B 21/145; G03B 21/14
See application file for complete search history.

(56) References Cited

U.S. PATENT DOCUMENTS

| 3,435,449 | A | * | 3/1969 | Sloan | ..................... | H05K 3/306 |
| | | | | | | 340/815.49 |
| 5,537,170 | A | * | 7/1996 | Lee | ......................... | G03B 33/12 |
| | | | | | | 340/933 |
| 8,246,179 | B2 | * | 8/2012 | Hsieh et al. | ......... | G03B 21/145 |
| | | | | | | 353/100 |
| 10,168,609 | B2 | * | 1/2019 | Kuroda | .................... | G02B 7/02 |
| 2003/0137753 | A1 | * | 7/2003 | Takase | ..................... | B41J 2/471 |
| | | | | | | 359/811 |
| 2005/0117127 | A1 | * | 6/2005 | Jang | ..................... | G03B 21/142 |
| | | | | | | 353/100 |
| 2011/0235002 | A1 | * | 9/2011 | Hsieh | ...................... | G03B 5/06 |
| | | | | | | 353/101 |

FOREIGN PATENT DOCUMENTS

| CN | 103097831 A | 5/2013 |
| CN | 107092154 A | 8/2017 |
| DE | 8611120 U1 | 4/1989 |

* cited by examiner

*Primary Examiner* — Cara E Rakowski
*Assistant Examiner* — Magda Cruz

(57) ABSTRACT

A projector includes a casing, a lens, a bracket, a support member, a first spacer and a first fixing member. The lens is connected to the casing. The bracket is connected to the casing and has a through hole formed thereon. The support member is inserted into the through hole and abuts against the lens. The first spacer is disposed on the support member and has a first curved surface and the first curved surface faces the through hole. The first fixing member is disposed on the support member and pushes the first spacer towards the bracket, such that the first curved surface contacts a periphery of the through hole.

10 Claims, 8 Drawing Sheets

PROJECTOR CAPABLE OF PREVENTING LENS FROM SHIFTING

BACKGROUND OF THE INVENTION

1. Field of the Invention

The invention relates to a projector and, more particularly, to a projector capable of preventing a lens from shifting.

2. Description of the Prior Art

Recently, projectors are getting more and more popular. With the capacity of video playing, projectors are applied not only for common office meetings, but also for various seminars or academic courses. In general, a projector may comprise various optical components including a lens, a light source, an optical engine module and so on, wherein the light source is configured to emit light beam and the light beam is processed by the optical engine module and then projected to form an image through the lens. Accordingly, the lens is an important optical component in the projector. Currently, in some projectors, an end of a lens (e.g. ultra short throw lens) is connected to a casing and another end of the lens extends away from the casing. After the projector is used for a span of time, the lens may shift due to its weight or insufficient strength of the projector, such that the projected image may shift accordingly.

SUMMARY OF THE INVENTION

An objective of the invention is to provide a projector capable of preventing a lens from shifting, so as to solve the aforesaid problems.

According to an embodiment of the invention, a projector comprises a casing, a lens, a bracket, a support member, a first spacer and a first fixing member. The lens is connected to the casing. The bracket is connected to the casing and has a through hole formed thereon. The support member is inserted into the through hole and abuts against the lens. The first spacer is disposed on the support member and has a first curved surface and the first curved surface faces the through hole. The first fixing member is disposed on the support member and pushes the first spacer towards the bracket, such that the first curved surface contacts a periphery of the through hole.

As mentioned in the above, the invention inserts the support member into the through hole of the bracket and the support member abuts against the lens, so as to utilize the support member to support the weight of the lens. Furthermore, the invention disposes the spacer with curved surface on the support member, so as to utilize the curved surface of the spacer to cooperate with the through hole of the bracket to absorb tolerance between components and tolerance in assembly. Accordingly, the invention can use the support member to support the lens without exerting any external forces, so as to prevent the lens from shifting due to its weight or insufficient strength of the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
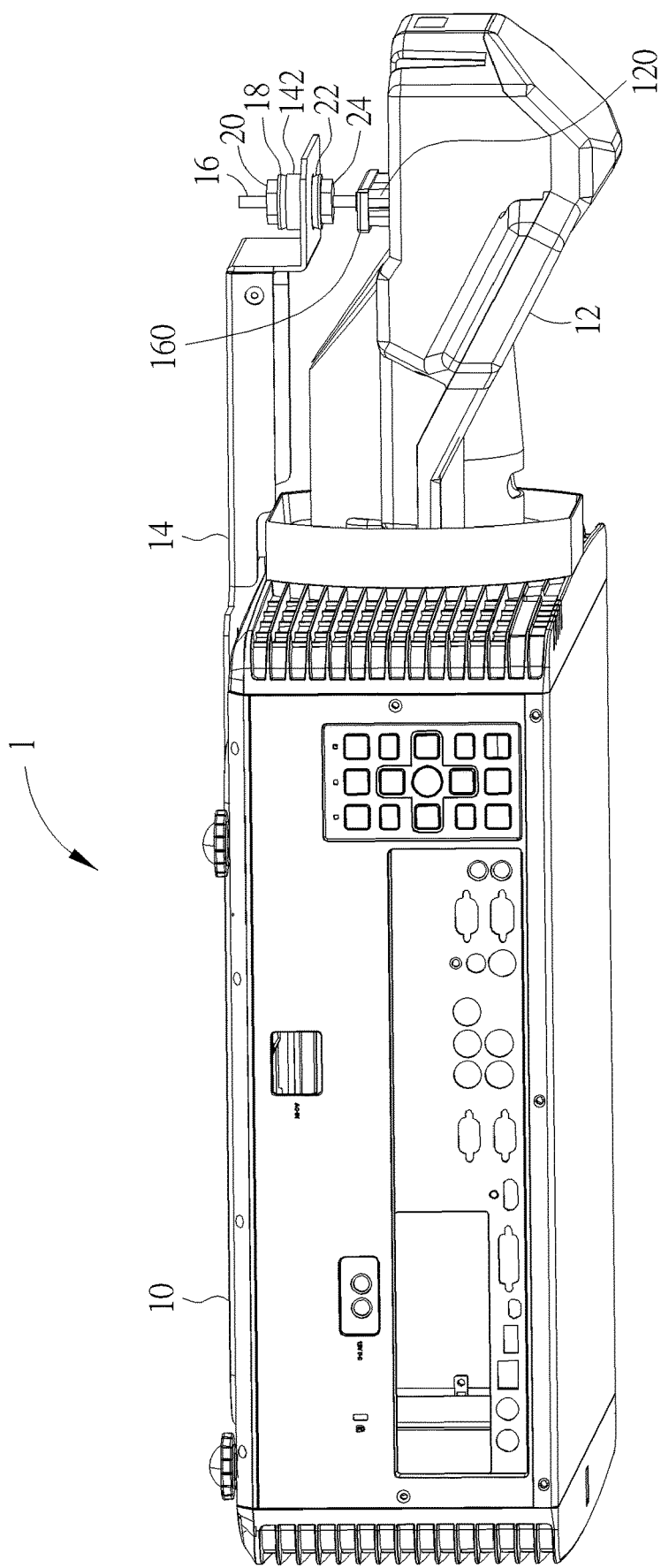
FIG. 1 is a perspective view illustrating a projector according to an embodiment of the invention.
Figure 2:
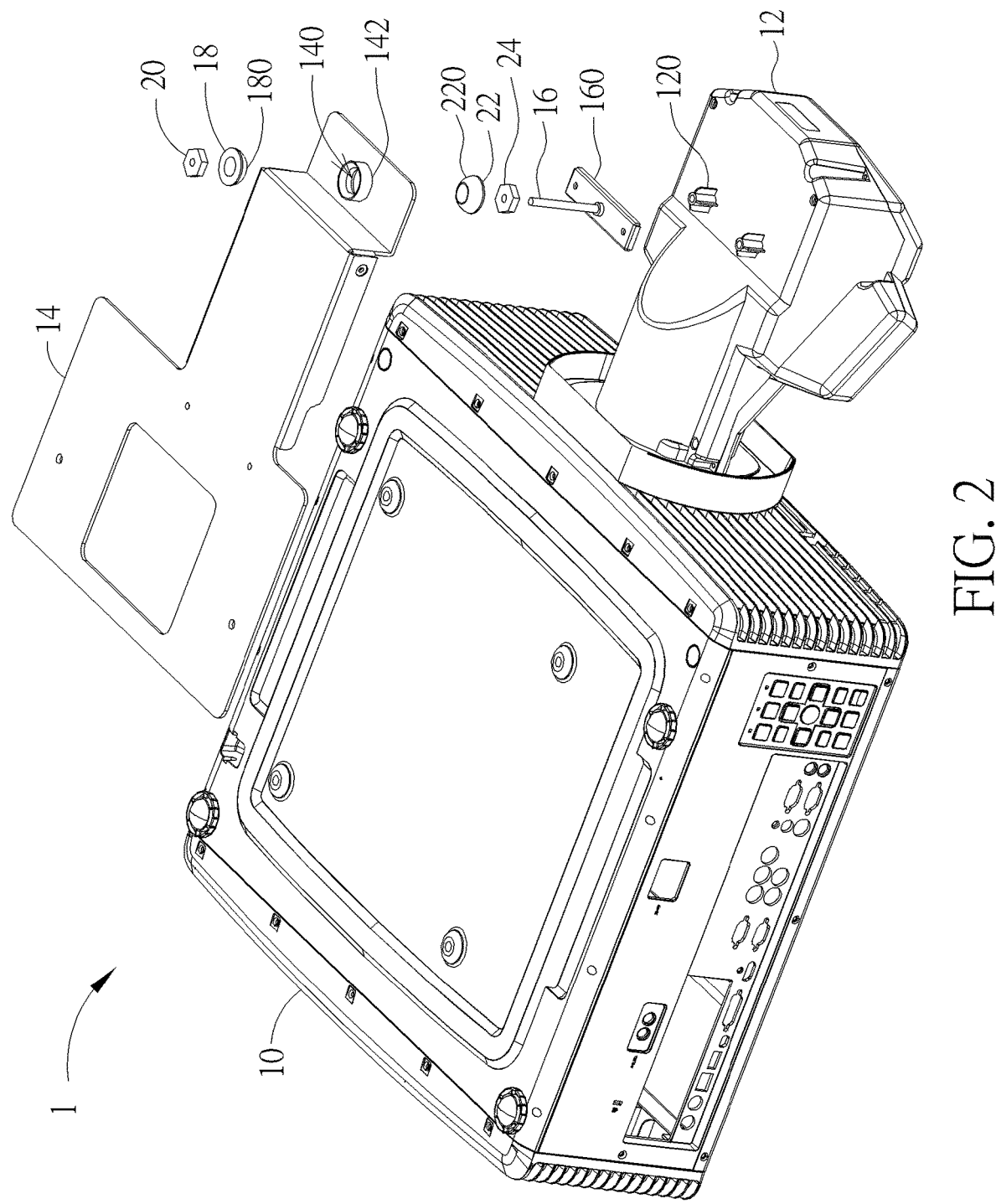
FIG. 2 is an exploded view illustrating the projector shown in FIG. 1.
Figure 3:
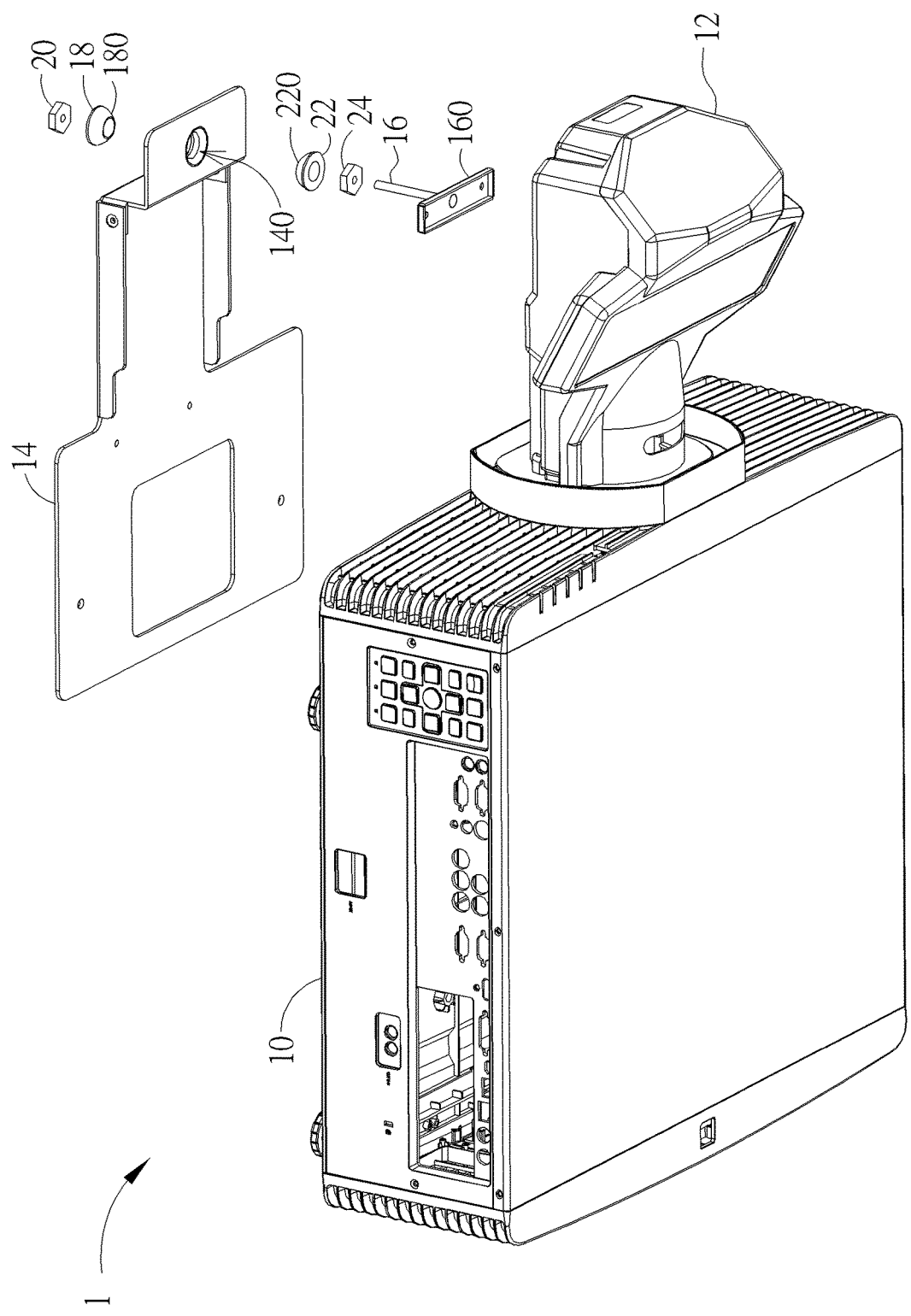
FIG. 3 is an exploded view illustrating the projector shown in FIG. 1 from another viewing angle.
Figure 4:
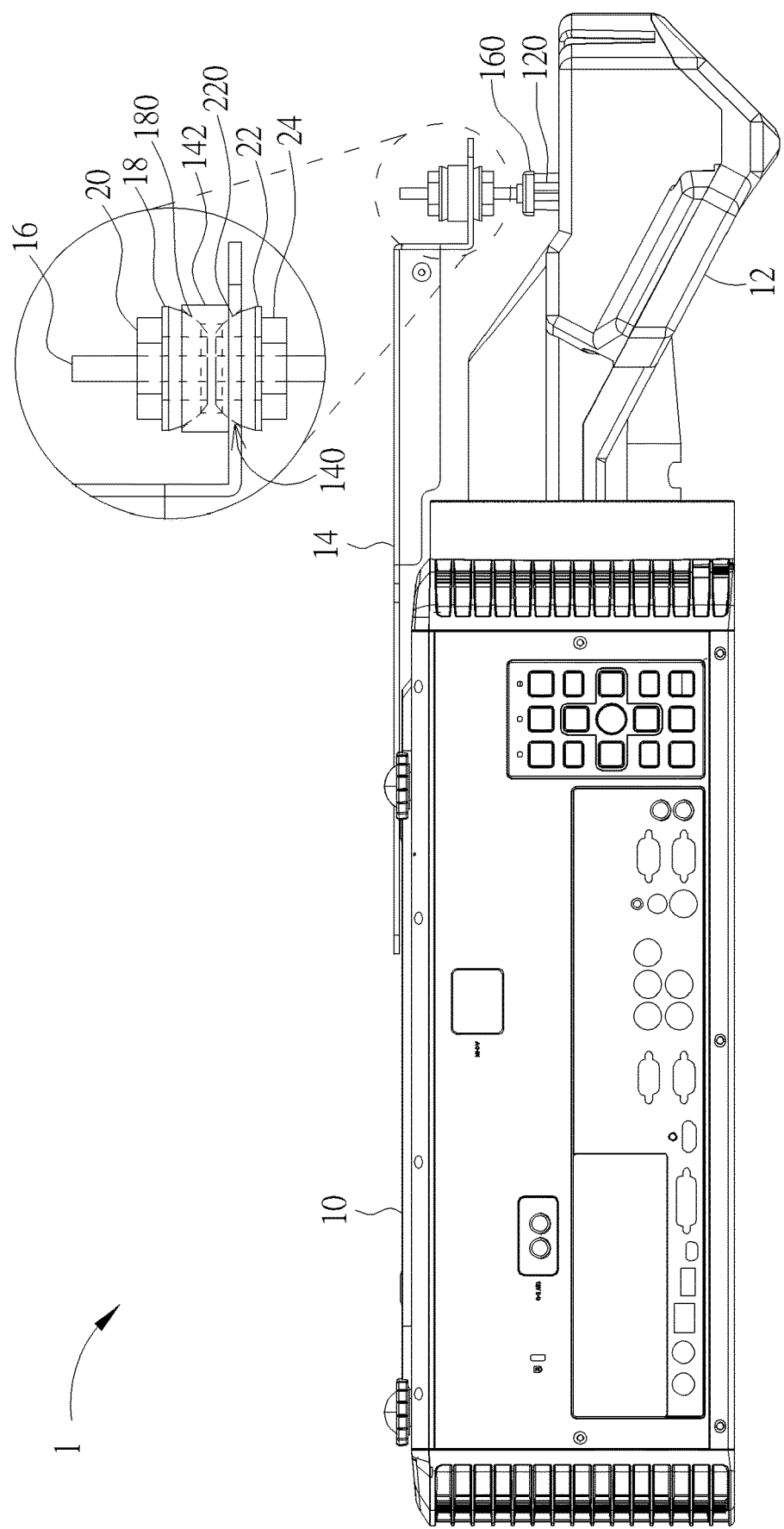
FIG. 4 is a side view illustrating the projector shown in FIG. 1.

Referring to FIGS. 1 to 4, FIG. 1 is a perspective view illustrating a projector 1 according to an embodiment of the invention, FIG. 2 is an exploded view illustrating the projector 1 shown in FIG. 1, FIG. 3 is an exploded view illustrating the projector 1 shown in FIG. 1 from another viewing angle, and FIG. 4 is a side view illustrating the projector 1 shown in FIG. 1.

As shown in FIGS. 1 to 4, the projector 1 comprises a casing 10, a lens 12, a bracket 14, a support member 16, a first spacer 18, a first fixing member 20, a second spacer 22 and a second fixing member 24. In general, the projector 1 may be further equipped with some necessary hardware or software components for specific purposes, such as a controller, a circuit board, a memory, a light source, a power supply, applications, a communication module, etc., and it depends on practical applications.

The lens 12 is connected to the casing 10. In this embodiment, the lens 12 may be, but not limited to, an ultra short throw lens. The bracket 14 is connected to the casing 10 and has a through hole 140 formed thereon. The support member 16 is inserted into the through hole 140 of the bracket 14 and abuts against the lens 12. In this embodiment, the support member 16 has a fixing portion 160 and the fixing portion 160 is fixed on the lens 12. In this embodiment, the invention may use screws to fix the fixing portion 160 of the support member 16 on the fixing pillars 120 of the lens 12, but is not so limited. In another embodiment, the fixing portion 160 of the support member 16 may be fixed on the lens 12 by engagement, adhesive, welding, and so on according to practical applications.

The first spacer 18 and the second spacer 22 are disposed on the support member 16, wherein the first spacer 18 and the second spacer 22 are located at opposite sides of the bracket 14. The first spacer 18 has a first curved surface 180. When the first spacer 18 is disposed on the support member 16, the first curved surface 180 faces the through hole 140 of the bracket 14. The first fixing member 20 is disposed on the support member 16 and pushes the first spacer 18 towards the bracket 14, such that the first curved surface 180 of the first spacer 18 contacts a periphery of the through hole 140 of the bracket 14. The second spacer 22 has a second curved surface 220. When the second spacer 22 is disposed on the support member 16, the second curved surface 220 faces the through hole 140 of the bracket 14. The second fixing member 24 is disposed on the support member 16 and pushes the second spacer 22 towards the bracket 14, such that the second curved surface 220 of the second spacer 22 contacts the periphery of the through hole 140 of the bracket 14. In this embodiment, the first fixing member 20 and the second fixing member 24 may be nuts with inner thread and the support member 16 may has outer thread correspondingly, such that the first fixing member 20 and the second fixing member 24 may be fixed on the support member 16 by the threads.

To assemble the aforesaid components, first, a user may fix the fixing portion 160 of the support member 16 on the lens 12. Then, the user may dispose the second fixing member 24 and the second spacer 22 on the support members 16. Then, the user may connect an end of the bracket 14 to the casing 10 and insert the support member 16 into the through hole 140 of the bracket 14. Then, the user may dispose the first spacer 18 and the first fixing member 20 on the support member 16. Then, the user may drive the first fixing member 20 to push the first spacer 18 towards the bracket 14 and drive the second fixing member 24 to push the second spacer 22 towards the bracket 14, such that the first curved surface 180 of the first spacer 18 and the second curved surface 220 of the second spacer 22 contact opposite sides of the periphery of the through hole 140 of the bracket 14, respectively.

When the projector 1 is hung on a ceiling or placed on a plane, the invention can utilize the support member 16 to support the weight of the lens 12 and utilize the first curved surface 180 of the first spacer 18 and the second curved surface 220 of the second spacer 22 to cooperate with the through hole 140 of the bracket 14 to absorb tolerance between components and tolerance in assembly. Accordingly, the invention can prevent the lens 12 from shifting due to its weight. In this embodiment, the first curved surface 180 and the second curved surface 220 may be, but not limited to, hemispheric curved surfaces. In another embodiment, the first curved surface 180 and the second curved surface 220 may be fan-shaped curved surfaces or other curved surfaces.

In this embodiment, the bracket 14 may have a first protruding portion 142, wherein the first protruding portion 142 protrudes from the periphery of the through hole 140 towards the first spacer 18. Accordingly, when the first fixing member 20 pushes the first spacer 18 towards the bracket 14, the first curved surface 180 of the first spacer 18 contacts the first protruding portion 142 of the periphery of the through hole 140. As shown in FIG. 4, the first protruding portion 142 separates the first spacer 18 and the second spacer 22 from each other, so as to prevent the first spacer 18 and the second spacer 22 from contacting each other and then losing function. The first protruding portion 142 may be a threadless nut riveted to the through hole 140 or, alternatively, the first protruding portion 142 may be formed by bending the periphery of the through hole 140 according to practical applications.

Figure 5:
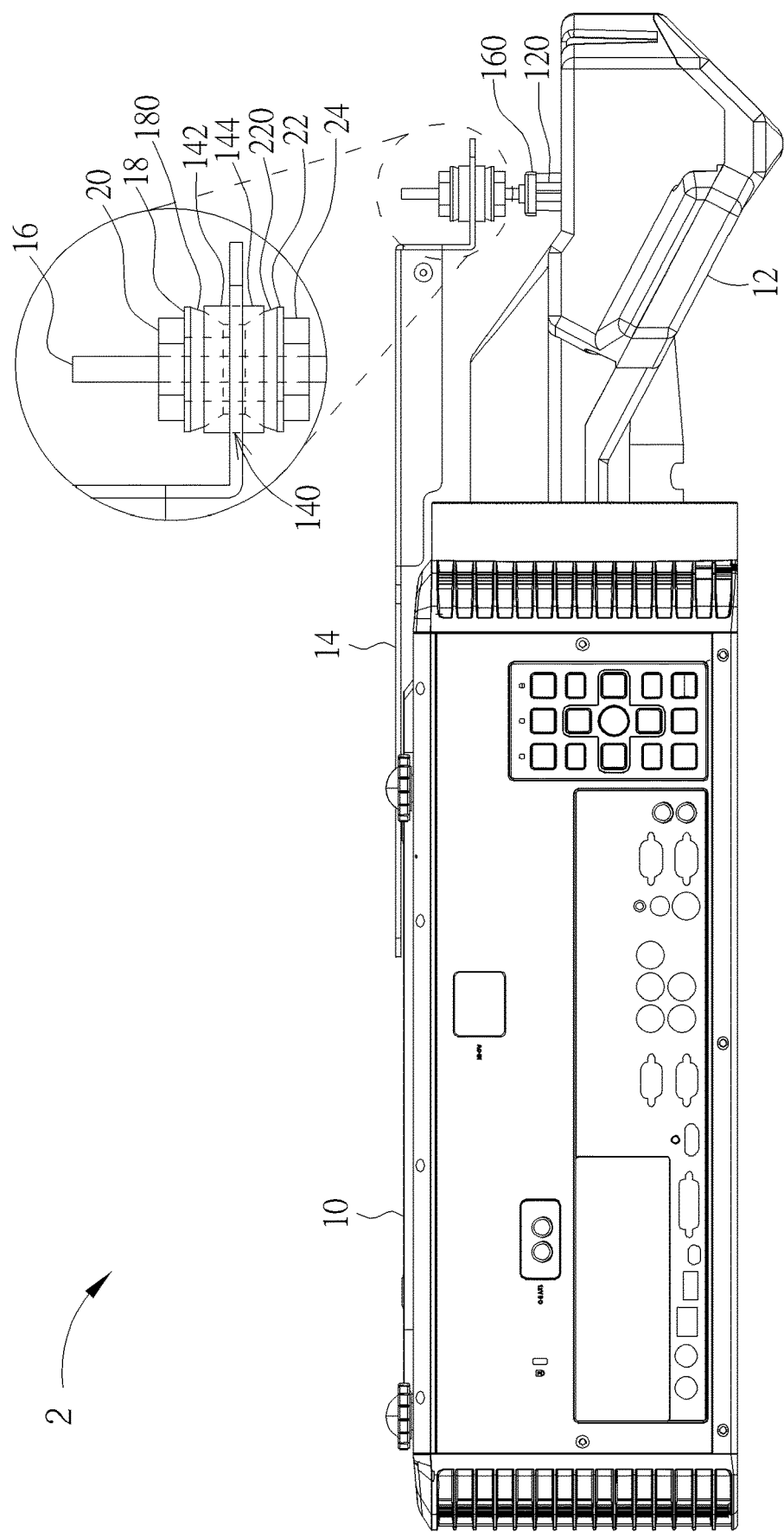
FIG. 5 is a side view illustrating a projector according to another embodiment of the invention.

Referring to FIG. 5, FIG. 5 is a side view illustrating a projector 2 according to another embodiment of the invention. The main difference between the projector 2 and the aforesaid projector 1 is that the bracket 14 of the projector 2 further has a second protruding portion 144, wherein the second protruding portion 144 protrudes from the periphery of the through hole 140 towards the second spacer 22, as shown in FIG. 5. Accordingly, when the second fixing member 24 pushes the second spacer 22 towards the bracket 14, the second curved surface 220 of the second spacer 22 contacts the second protruding portion 144 of the periphery of the through hole 140. As shown in FIG. 5, the first protruding portion 142 and the second protruding portion 144 separate the first spacer 18 and the second spacer 22 from each other, so as to prevent the first spacer 18 and the second spacer 22 from contacting each other and then losing function. As the first protruding portion 142 mentioned in the above, the second protruding portion 144 may be a threadless nut riveted to the through hole 140 or, alternatively, the second protruding portion 142 may be formed by bending the periphery of the through hole 140 according to practical applications.

Figure 6:
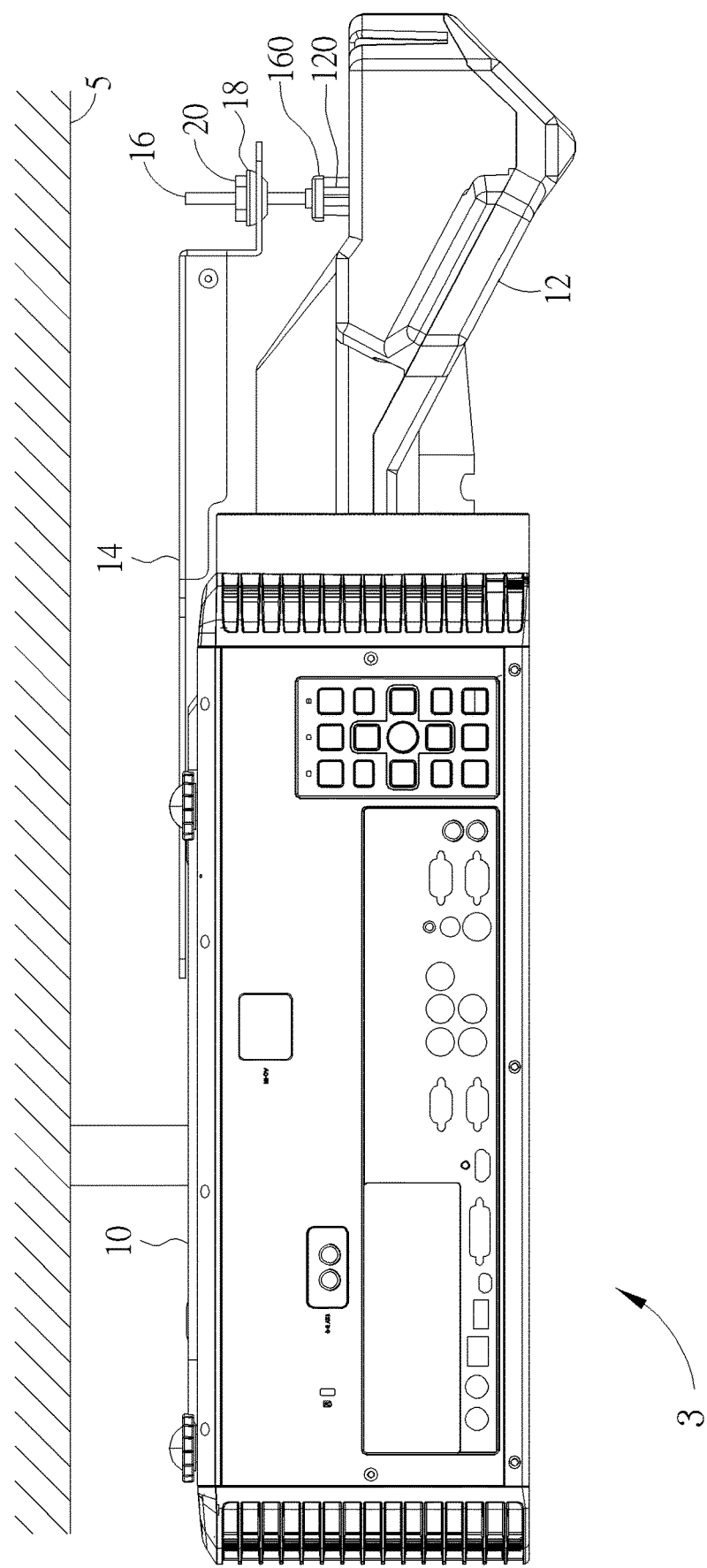
FIG. 6 is a side view illustrating a projector according to another embodiment of the invention.

Referring to FIG. 6, FIG. 6 is a side view illustrating a projector 3 according to another embodiment of the invention. As shown in FIG. 6, when the projector 3 is hung on a ceiling 5, the aforesaid second spacer 22 and second fixing member 24 may be omitted from the projector 3 and the first spacer 18 and the first fixing member 20 are located at a side of the bracket 14 close to the ceiling 5, so as to utilize the first spacer 18 to cooperate with the bracket 14 to absorb tolerance in assembly. It should be noted that since the projector 3 does not comprise the aforesaid second spacer 22, the aforesaid first protruding portion 142 may be omitted from the bracket 14.

Figure 7:
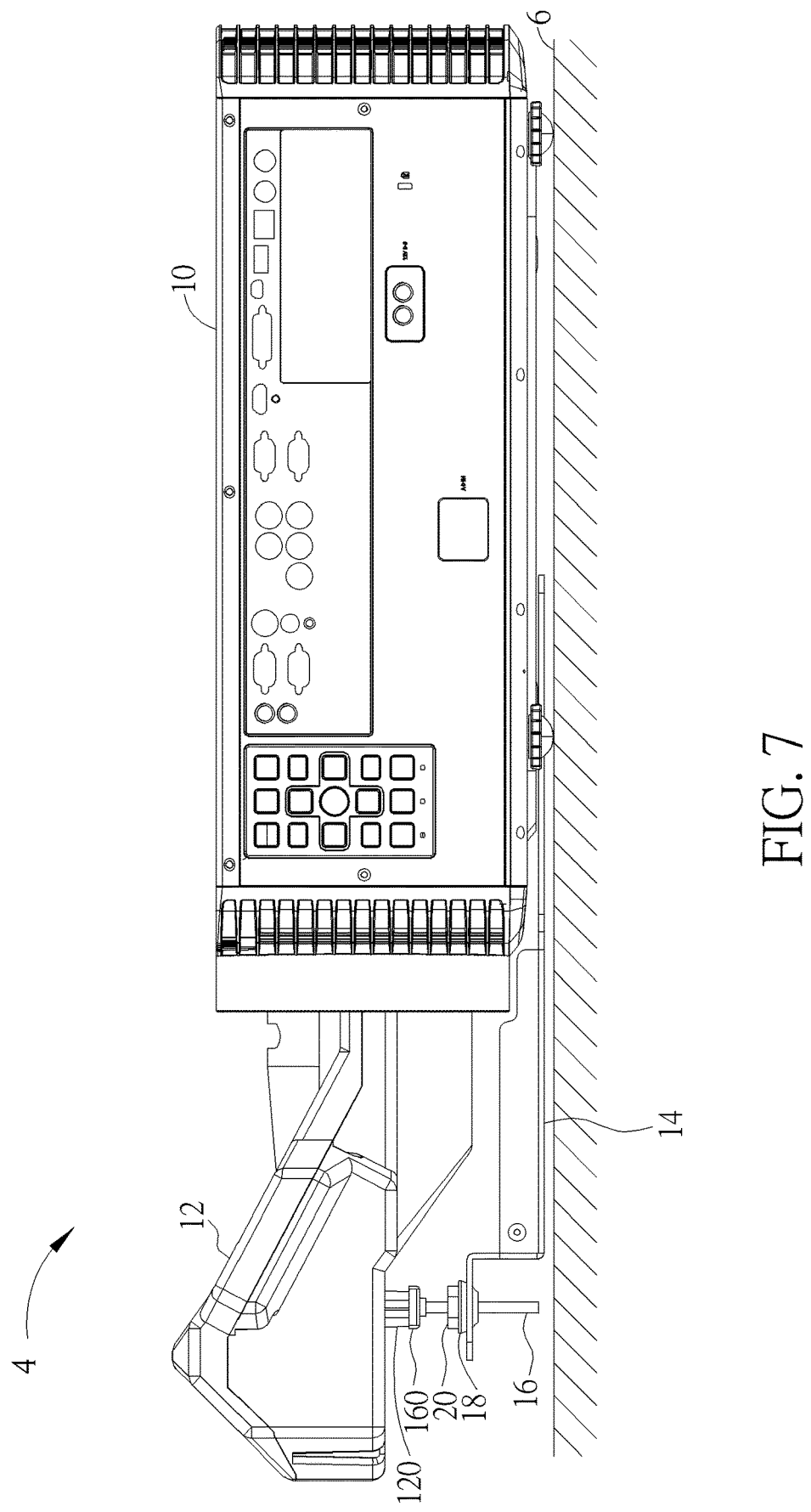
FIG. 7 is a side view illustrating a projector according to another embodiment of the invention.

Referring to FIG. 7, FIG. 7 is a side view illustrating a projector 4 according to another embodiment of the invention. As shown in FIG. 7, when the projector 4 is placed on a plane 6, the aforesaid second spacer 22 and second fixing member 24 may be omitted from the projector 4 and the first spacer 18 and the first fixing member 20 are located at a side of the bracket 14 close to the lens 12, so as to utilize the first spacer 18 to cooperate with the bracket 14 to absorb tolerance in assembly. It should be noted that since the projector 4 does not comprise the aforesaid second spacer 22, the aforesaid first protruding portion 142 may be omitted from the bracket 14. Furthermore, when the support member 16 abuts against the lens 12, the support member 16 can support the weight of the lens 12 well. Accordingly, when the projector 4 is placed on the plane 6, it is unnecessary to fix the support member 16 on the lens 12.

Figure 8:
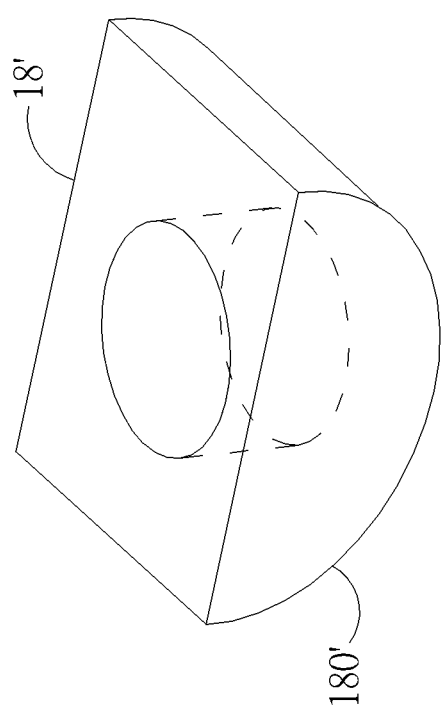
FIG. 8 is a perspective view illustrating a first spacer according to another embodiment of the invention.

Referring to FIG. 8, FIG. 8 is a perspective view illustrating a first spacer 18' according to another embodiment of the invention. The main difference between the first spacer 18' and the aforesaid first spacer 18 is that the first curved surface 180' of the first spacer 18' is a fan-shaped curved surface, as shown in FIG. 8. Furthermore, the second curved surface 220 of the aforesaid second spacer 22 may also be a fan-shaped curved surface shown in FIG. 8.

As mentioned in the above, the invention inserts the support member into the through hole of the bracket and the support member abuts against the lens, so as to utilize the support member to support the weight of the lens. Furthermore, the invention disposes the spacer with curved surface on the support member, so as to utilize the curved surface of the spacer to cooperate with the through hole of the bracket to absorb tolerance between components and tolerance in assembly. Accordingly, the invention can use the support member to support the lens without exerting any external forces, so as to prevent the lens from shifting due to its weight or insufficient strength of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
   a casing;
   a lens connected to the casing;
   a bracket connected to the casing, the bracket having a through hole formed thereon;
   a support member inserted into the through hole and abutting against the lens;

a first spacer disposed on the support member, the first spacer having a first curved surface, the first curved surface facing the through hole; and a first fixing member movably disposed on the support member and pushing the first spacer towards the bracket, such that the first curved surface contacts a periphery of the through hole and at least a part of the first curved surface sinks into the through hole.

2. The projector of claim 1, wherein the first curved surface is a fan-shaped curved surface or a hemispheric curved surface.

3. The projector of claim 1, wherein the bracket has a first protruding portion and the first protruding portion protrudes from the periphery of the through hole towards the first spacer.

4. The projector of claim 3, wherein the first protruding portion is a threadless nut riveted to the through hole or the first protruding portion is formed by bending the periphery of the through hole.

5. The projector of claim 1, further comprising:

a second spacer disposed on the support member, the first spacer and the second spacer being located at opposite sides of the bracket, the second spacer having a second curved surface, the second curved surface facing the through hole; and a second fixing member disposed on the support member and pushing the second spacer towards the bracket, such that the second curved surface contacts the periphery of the through hole.

6. The projector of claim 5, wherein the first fixing member and the second fixing member are fixed on the support member by threads.

7. The projector of claim 5, wherein the second curved surface is a fan-shaped curved surface or a hemispheric curved surface.

8. The projector of claim 5, wherein the bracket has a second protruding portion and the second protruding portion protrudes from the periphery of the through hole towards the second spacer.

9. The projector of claim 8, wherein the second protruding portion is a threadless nut riveted to the through hole or the second protruding portion is formed by bending the periphery of the through hole.

10. The projector of claim 1, wherein the support member has a fixing portion and the fixing portion is fixed on the lens.

* * * * *